United States Patent
Odu et al.

(10) Patent No.: US 12,358,851 B2
(45) Date of Patent: Jul. 15, 2025

(54) METHOD FOR THE CONTINUOUS PRODUCTION OF A MIXTURE WITH A PRE-DEFINED RATIO OF FULLY COLORED AND NON-COLORED FERTILIZER PARTICLES AND SYSTEM AND USE THEREOF

(71) Applicant: Yara International ASA, Oslo (NO)

(72) Inventors: Samuel Odu, Terneuzen (NL); Thomas Fahrenwaldt, Ribnitz-Damgarten (DE); Christian Ross, Käterhagen (DE)

(73) Assignee: YARA INTERNATIONAL ASA, Oslo (NO)

( * ) Notice: Subject to any disclaimer, the term of this patent is extended or adjusted under 35 U.S.C. 154(b) by 582 days.

(21) Appl. No.: 17/779,938

(22) PCT Filed: Dec. 4, 2020

(86) PCT No.: PCT/EP2020/084613
§ 371 (c)(1),
(2) Date: May 25, 2022

(87) PCT Pub. No.: WO2021/110906
PCT Pub. Date: Jun. 10, 2021

(65) Prior Publication Data
US 2023/0002292 A1  Jan. 5, 2023

(30) Foreign Application Priority Data
Dec. 4, 2019 (EP) .................................... 19213576

(51) Int. Cl.
*C05G 5/30* (2020.01)
*B05D 5/06* (2006.01)
(Continued)

(52) U.S. Cl.
CPC ................. *C05G 5/37* (2020.02); *B05D 5/06* (2013.01); *C05C 1/02* (2013.01); *C05G 5/10* (2020.02)

(58) Field of Classification Search
CPC ... C05G 5/37; C05G 5/10; C05G 3/00; B05D 5/06; C05C 1/02; C05C 5/005; C05C 9/005; C11D 17/06
See application file for complete search history.

(56) References Cited

U.S. PATENT DOCUMENTS

2007/0003694 A1* 1/2007 Chiruvolu ................ B01J 2/003
427/532

FOREIGN PATENT DOCUMENTS

| BY | 13569 C1 | 8/2010 |
| CN | 201510857 U | 6/2010 |

(Continued)

OTHER PUBLICATIONS

International Search Report and Written Opinion issued in App. No. PCT/EP2020/084613, mailing date Apr. 6, 2021, 14 pages.
International Preliminary Report on Patentability issued in App. No. PCT/EP2020/084613, mailing date Nov. 22, 2021, 8 pages.
Russian Office Action (including English translation) issued in App. No. RU2022118163, dated Apr. 24, 2024, 7 pages.
(Continued)

*Primary Examiner* — James M Mellott
(74) *Attorney, Agent, or Firm* — Dilworth IP, LLC

(57) ABSTRACT

A method for continuous production of fully colored and non-colored fertilizer particles having a median size of about 1 to 6 mm, with a predefined ratio of the fully colored and non-colored fertilizer particles, starting from a stream A of non-colored fertilizer particles. The method includes continuously separating the stream A of non-colored fertilizer particles into a stream C of non-colored fertilizer particles and parallel streams B1, B2, ... Bn of non-colored fertilizer particles in a predefined ratio, continuously coloring the non-colored particles from the parallel streams B1, B2, ... Bn with a non-rub-off coloring agent, such that the particles
(Continued)

become fully colored, continuously joining the parallel streams B1, B2, ... Bn, including the fully colored fertilizer particles, with the stream C of non-colored fertilizer particles downstream, thereby obtaining the mixture of fully colored and non-colored fertilizer particles, and, optionally, processing the mixture of fully colored and non-colored fertilizer particles.

10 Claims, 1 Drawing Sheet

(51) Int. Cl.
*C05C 1/02* (2006.01)
*C05G 5/10* (2020.01)

(56) References Cited

FOREIGN PATENT DOCUMENTS

| CN | 106268500 | A | 1/2017 |
|----|-----------|---|--------|
| CN | 109851419 | A | 6/2019 |
| GB | 389508 | A | 3/1933 |
| RU | 2225856 | C1 | 3/2004 |
| RU | 2375329 | C2 | 12/2009 |
| WO | 2004000759 | | 12/2003 |
| WO | 2015127219 | A1 | 8/2015 |

OTHER PUBLICATIONS

Chinese Office Action (including English translation) issued in App. No. CN202080074801, dated Nov. 3, 2022, 21 pages.

* cited by examiner

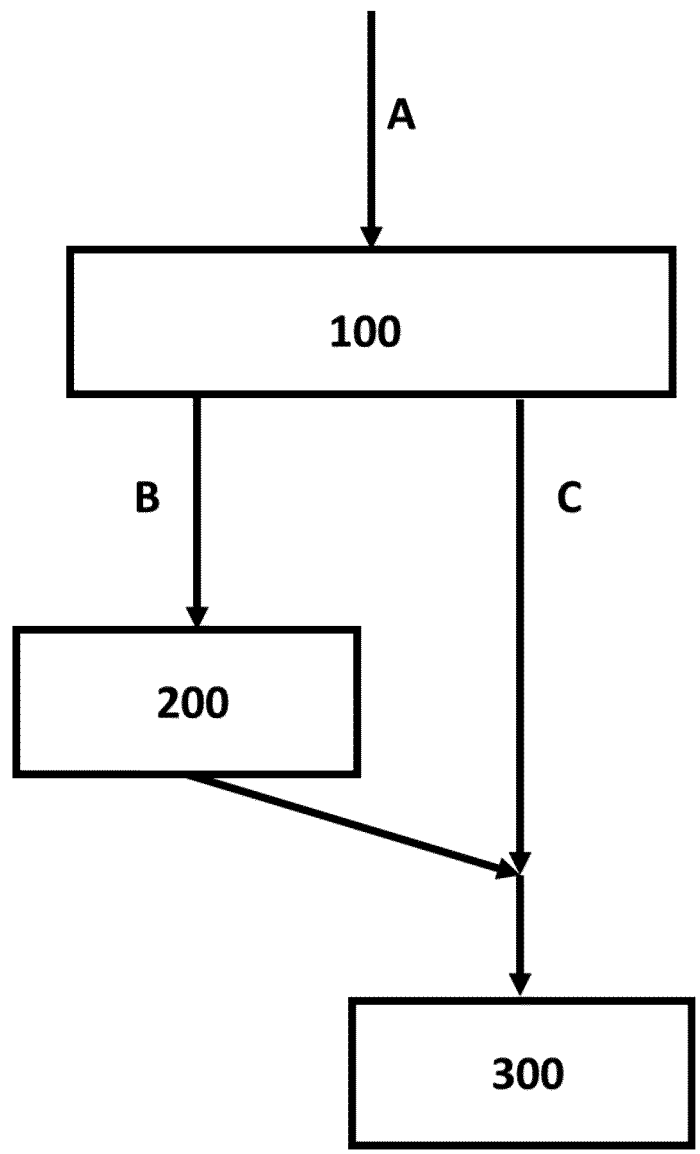

METHOD FOR THE CONTINUOUS PRODUCTION OF A MIXTURE WITH A PRE-DEFINED RATIO OF FULLY COLORED AND NON-COLORED FERTILIZER PARTICLES AND SYSTEM AND USE THEREOF

FIELD OF THE INVENTION

The invention relates to the field of continuous production of mixtures of colored and non-colored fertilizer particles.

BACKGROUND OF THE INVENTION

The production of mixtures of colored and non-colored particles finds various applications in today market. In particular, the production of such mixtures of colored and non-colored particles finds application in the production of commercial washing powders having a speckled appearance. In addition, such mixtures are valuable for brand recognition purposes: through the coloring of a specific weight percentage of a product, the customer can subsequently, through imaging techniques know that he has been provided with the product that he intends to use.

Conventionally, a mixture of colored and non-colored particles is produced from two production lines, one line producing colored particles and the other line producing non colored particles, and subsequent mixing of the colored and non-colored particles. An alternative to this production method is to produce a final non-colored product, for subsequent processing of part of this final product through a coloring step, after which the resulting colored particles are mixed with the non-colored particles.

A problem with the conventional production of mixtures of colored and non-colored particles therefore is the cost associated to separate production lines. In the case of a coloring line downstream the production line for a non-colored product, a problem is that additional time, and hence costs, are required for producing the final mixture of colored and non-colored particles. In addition, the coloring agent then is present on the colored particles as an external coloring layer added onto finished non-colored particles. There is a risk that the coloring layer will be rubbed-off during storage and transportation of the mixture. This is especially relevant for products that require loading and discharge from the production site, before being processed to a bagging unit.

GB 389508A relates to the production of fertilizers in granular form and its principal object is to reduce the tendency of such fertilizers to cake on storage or transport in bulk. It discloses the coating of such fertilizers with a thin smooth layer of a suitable anti-caking agent such as rock phosphate, calcium carbonate, talc or asbestos. The invention is suitably carried into effect by agitating a quantity of granules, which are preferably previously dried as far as possible, with a small quantity of powdered anti-caking agent e.g. 0.5-3 percent by weight of the granules. Colored granules may be obtained by using a colored non-caking substance (e.g. red iron oxide) or by admixing a suitable colored material (e.g. ultramarine) with the non-caking substance.

The prior art does not suggest a process to produce a mixture of colored and non-colored fertilizer particles, in which the colored fertilizer particles are fully colored and their amount is precisely controlled, and without the need for using separate production lines for the production of differently colored fertilizer particles. The prior art also does not suggest a system for performing such a process. There thus remains a need for a cost-efficient process to produce a mixture of colored and non-colored fertilizer particles, in which the colored fertilizer particles are fully colored and their amount is precisely controlled, and also a need for a system for performing such a process. Such process should allow for the color to be either well absorbed in the fertilizer particles to be colored or adsorbed onto the surface of those fertilizer particles. Finally, the process should be versatile and allow for the production of a mixture of non-colored fertilizer particles and differently colored fertilizer particles without the need for using separate production lines for the production of differently colored particles.

The prior art also does not suggest a mixture of colored and non-colored fertilizer particles in which the colored fertilizer particles comprise a coloring layer that is both water soluble, and protected in order to prevent the rub-off of the color.

SUMMARY OF THE INVENTION

According to a first aspect of the present disclosure, a method is disclosed for the continuous production of a mixture of fully colored and non-colored fertilizer particles having a median size of about 1 to 6 mm with a predefined ratio of fully colored and non-colored fertilizer particles, starting from a stream A of non-colored fertilizer particles, wherein the method comprises the steps of:
  a1) continuously separating the stream A of non-colored particles into a stream C of non-colored fertilizer particles and one or more parallel streams B1, B2, . . . Bn of non-colored fertilizer particles in a predefined ratio;
  b1) continuously coloring the non-colored fertilizer particles from the parallel particle streams B1, B2, . . . Bn obtained from step a1) with a non-rub-off coloring agent, such that the particles become fully colored;
  c1) continuously joining the parallel particle streams B1, B2, . . . Bn, now comprising the fully colored particles, obtained from step b1), with the stream C of non-colored particles downstream of the separation step a1), thereby obtaining the mixture of fully colored and non-colored fertilizer particles, and;
  d1) optionally, processing the mixture of fully colored and non-colored fertilizer particles, obtained from step c1).

According to one embodiment of the method of the disclosure, the process step d1) comprises coating the fertilizer particles, i.e. the mixture of fully colored and non-colored fertilizer particles, with a non-coloring coating agent.

According to one embodiment of the method of the disclosure, the coloring agent is a water-soluble, polymeric coloring agent and wherein the coating agent prevents or reduces moisture uptake.

According to one embodiment of the method of the disclosure, the method further comprises the steps of:
  e1) online determining the total mass of non-colored fertilizer particles in each of the parallel streams B1, B2, . . . Bn of non-colored fertilizer particles and the stream C of non-colored fertilizer particles, obtained from step a1);
  f1) adjusting the continuous separation in step a1) according to the total mass of non-colored fertilizer particles in each of the streams B1, B2, . . . Bn of non-colored fertilizer particles and the stream C of non-colored fertilizer particles, determined in step e1), such that the total mass of non-colored fertilizer particles in each stream B1, B2, . . . Bn of non-colored fertilizer particles represents a weight percentage ranging from 0.5 to 5 weight % of the total mass of non-colored fertilizer particles in the stream A of non-colored fertilizer particles.

According to one embodiment of the method of the disclosure, the mass of fertilizer particles in each stream B1, B2, . . . Bn of non-colored fertilizer particles represents about 1 weight % of the mass of fertilizer particles in the particle stream A of non-colored fertilizer particles.

According to one embodiment of the method of the disclosure, the fertilizer particles are based on compounds selected from the group of calcium nitrate, ammonium nitrate, calcium ammonium nitrate, urea and NPK and have a median size of about 1 to 6 mm, preferably from 3.5 to 4.0 mm, and the method further comprises the step of adjusting the temperature of the fertilizer particles in the stream A of non-colored fertilizer particles to a temperature of about 40° C., before step a1).

According to one embodiment of the method of the disclosure, the fertilizer particles in each stream of non-colored fertilizer B1, B2, . . . Bn become fully colored in step b1) by a different coloring agent.

According to one embodiment of the method of the disclosure, the method allows for the continuous production of fully colored and non-colored fertilizer particles having a median size of about 1 to 6 mm, preferably from 3.5 to 4.0 mm, wherein the fertilizer particles are produced from a liquid melt based on compounds selected from the group of calcium nitrate, ammonium nitrate, calcium ammonium nitrate, urea and NPK, with a predefined ratio of fully colored and non-colored fertilizer particles, starting from a stream A of non-colored fertilizer particles, and comprises the steps of:
- g1) producing the stream A of non-colored fertilizer particles from the liquid melt;
- h1) adjusting the temperature of the non-colored fertilizer particles in the stream A of non-colored fertilizer particles to a temperature of about 40° C.;
- a1') continuously separating the particle stream A of non-colored fertilizer particles into a stream C of non-colored fertilizer particles and a parallel stream B1 of non-colored fertilizer particles in a predefined ratio;
- b1') continuously coloring the fertilizer particles from the parallel stream B1 of non-colored fertilizer particles obtained from step a1') with a water-soluble, polymeric non rub-off coloring agent using a coloring drum or a spray-coater, such that the particles become fully colored;
- c1') continuously joining the parallel stream B1, now comprising the colored fertilizer particles, obtained from step b1'), with the stream C of non-colored fertilizer particles downstream the separation step a1'), thereby obtaining the mixture of fully colored and non-colored fertilizer particles, and;
- d1') coating the mixture of fully colored and non-colored fertilizer particles from the particle stream obtained from step c1') with a non-coloring coating agent.

According to a further aspect of the disclosure, a system for the continuous production of a mixture of fully colored and non-colored fertilizer particles having a median size of about 1 to 6 mm, with a predefined ratio of fully colored and non-colored fertilizer particles, is disclosed and comprises:
- a2) separating means for continuously separating a stream A of non-colored fertilizer particles into a particle stream C of non-colored fertilizer particles and one or more parallel particle streams B1, B2, . . . Bn of non-colored fertilizer particles in a predefined ratio;
- b2) coloring means for continuously coloring the non-colored fertilizer particles from the parallel streams B1, B2, . . . Bn of non-colored fertilizer particles obtained from separating means a2) with a non-rub-off coloring agent;
- c2) joining means for continuously joining the parallel particle streams B1, B2, . . . Bn now comprising the fully colored particles, obtained from coloring means b2), with the particle stream C of non-colored fertilizer particles downstream of separating means a2), thereby obtaining the mixture of fully colored and non-colored fertilizer particles, and;
- d2) optionally, processing means for processing the mixture of fully colored and non-colored fertilizers particle stream obtained from joining means c2).

According to one embodiment of the system of the system of the disclosure, the processing means d2) are coating means.

According to one embodiment of the system of the disclosure, the coloring means b2 comprises a coloring drum or a spray-coater.

According to one embodiment of the system of the disclosure, the system further comprises:
- e2) means for determining the total mass of particles in each of the parallel particle streams B1, B2, . . . Bn and particle stream C, obtained from means a2);
- f2) means for adjusting the continuous separation by means a2) according to the total mass of particles in each of the particle streams B1, B2, . . . Bn and particle stream C determined by means e2), such that the total mass of particles in each particle stream B1, B2, . . . Bn represents a weight percentage ranging from 0.5 to 5 weight % of the total mass of particles in particle stream A.

According to one embodiment of the system of the disclosure, the system further comprises a production plant for the production of fertilizer particles produced from a liquid melt based on compounds, selected from the group of calcium nitrate, ammonium nitrate, calcium ammonium nitrate, urea and NPK, comprising:
- g2) production means for producing a stream A of non-colored fertilizer particles from the liquid melt;
- h2) temperature adjusting means for adjusting the temperature of the non-colored fertilizer particles, produced by production means g2), to a temperature of about 40° C.;

wherein coloring means b2) comprises a coloring drum or a spray-coater, and wherein processing means d2) comprises coating means.

According to a further aspect of the disclosure, the use of a system according to the system of the disclosure is disclosed for performing the method according to the method of the disclosure.

According to a further aspect of the disclosure, ammonium nitrate-based or calcium ammonium nitrate-based fertilizer particles are disclosed. The fertilizer particles have a median size of about 1 to 6 mm, preferably from 3.5 to 4.0 mm, about 1 weight % of the fertilizer particles is fully colored by a layer of a water-soluble, polymeric coloring agent, about 100 weight % of the fertilizer particles is coated by a layer of a non-coloring coating agent, and the layer of the non-coloring coating agent is on top of the layer of the coloring agent of the fully colored fertilizer particles.

BRIEF DESCRIPTION OF THE DRAWING

FIG. 1: FIG. 1 shows a schematic representation of the system in which some particles are colored by one coloring agent in a coloring drum.

DETAILED DESCRIPTION OF THE INVENTION

Throughout the description and claims of this specification, the words "comprise" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

Throughout this application, the term "about" is used to indicate that a value includes the standard deviation of error for the device or method being employed to determine the value.

All references cited in this description are hereby deemed to be incorporated in their entirety by way of reference.

According to a first aspect of the present disclosure, a method is disclosed for the continuous production of fully colored and non-colored fertilizer particles having a median size of about 1 to 6 mm, with a predefined ratio of fully colored and non-colored fertilizer particles, starting from a stream A of non-colored fertilizer particles and comprises the steps of:

a1) continuously separating the stream A of non-colored fertilizer particles into a stream C of non-colored fertilizer particles and one or more parallel streams B1, B2, ... Bn of non-colored fertilizer particles in a predefined ratio;

b1) continuously coloring the non-colored fertilizer particles from the parallel particle streams B1, B2, ... Bn obtained from step a1) with a non-rub-off coloring agent, such that the particles become fully colored;

c1) continuously joining the parallel streams B1, B2, ... Bn, now comprising the colored particles, obtained from step b1), with the stream C of non-colored particles downstream of the separation step a1), and;

d1) optionally, processing the particle stream, thereby obtaining the mixture of fully colored and non-colored fertilizer particles, obtained from step c1).

As defined herein, a fully colored fertilizer particle is a fertilizer particle that comprises a coloring layer fully (100%) or essentially fully (more than 95%, 96%, 97%, 98%, 99% or 99.5%) covering the entire outer surface of the particle, such that the colored fertilizer particle has a different appearance than the fertilizer particle without the coloring layer. It is therefore apparent that the color used for the coloring is different than the color of the non-colored fertilizer particle. A fully colored fertilizer particle thus comprises no or essentially no uncolored areas on its outer surface.

The inventors have discovered that the method of the disclosure allows for the continuous production of a mixture of colored and non-colored fertilizer particles, with predefined ratios of one or more types of fully colored fertilizer particles and non-colored particles. Such mixtures are particularly useful for brand recognition purposes. The method avoids the need for subjecting part of the finished fertilizer product (obtained after a fertilizer particles production unit) to a (batch) coloring step and subsequently mixing the colored fertilizer particles with non-colored fertilizer particles. Therefore, the method of the disclosure results in reduction of the production time. In addition, the method of the disclosure avoids the need for preparing differently colored and non-colored fertilizer particles through separate process lines. Consequently, the method of the disclosure results in saving of production costs, both associated to the production equipment and to the operation of this equipment.

The method further presents the advantage that additional time is provided in steps c1) and also d1) for the color to either dry following adsorption onto the fertilizer particle, or to be absorbed by the fertilizer particle. In other words, step c1) allows for additional time for the completion of the coloring step b1).

The use of non-rub-off coloring agents enables for a coloring layer to stay onto each colored fertilizer particle, which in turn allows for the control of the amount of fully colored fertilizer particles, downstream in the process.

The person skilled in the art will understand that the method can be performed such that only part of streams B1, B2, ... Bn comprising the colored fertilizer particles, obtained from step b1) may be joined with the particle stream C in step c1), such that over time a buffer of colored fertilizer particles is accumulated while performing step b1). Alternatively, a buffer of colored fertilizer particles can be produced by performing the step b1) on fertilizer particles identical to those of the particles in the particle stream A, before performing the steps a1) to d1) of the method of the disclosure.

According to one embodiment of the method of the disclosure, the process step d1) comprises coating the fertilizer particles with a non-coloring coating agent. As defined herein, the non-coloring agent is a substantially colorless agent that will not interfere with the imaging analysis of the mixture fertilizer product, in order for the customer to recognize and validate a certain brand. In particular, the non-coloring coating agent is a mixture comprising an amine-based active ingredients and mixtures of mineral oils and mineral waxes. When coated with one of those agents, the fertilizer particles will be protected from moisture and preserve their strength and not aggregate to each other, which is especially relevant for hygroscopic fertilizer particles. In addition, those agents may act as anti-caking agents. Moreover, those agents contribute to protecting a coloring layer onto the surface of each colored fertilizer particle, such that the coloring layer does not rub-off from the particle. As mentioned above, such coating step further provides the benefit of additional time for the color to either dry following adsorption onto the fertilizer particles, or to be absorbed by the fertilizer particles. In other words, the coating step allows for additional time for the completion of the coloring step b1).

According to one embodiment of the method of the disclosure, the coloring agent is a water-soluble, polymeric coloring agent. The color of the coloring agent is not limiting. Mixtures of Liquitint® compounds manufactured by Milliken and monopropylene glycol have been found particularly suitable for use as the coloring agent. The color of the Liquitint® compounds can, for example, be blue, red, green or yellow.

The combination of water-soluble, polymeric coloring agents and non-coloring coating agents provides the combined advantages of rapid adsorption of the coloring agent onto the fertilizer particle and optimal interaction of the coloring agent with the coating agent, such that the fertilizer particles are protected from moisture, which is especially relevant for hygroscopic fertilizer particles, and remain colored, as the coating agent further protects the coloring layer from being rubbed-off from each colored fertilizer particle.

According to one embodiment of the method of the disclosure, the method further comprises the steps of:
- e1) online determining the total mass of non-colored fertilizer particles in each of the parallel streams B1, B2, . . . Bn of non-colored fertilizer particles and the stream C of non-colored fertilizer particles, obtained from step a1);
- f1) adjusting the continuous separation in step a1) according to the total mass of non-colored fertilizer particles in each of the streams B1, B2, . . . Bn of non-colored fertilizer particles and the stream C of non-colored fertilizer particles, determined in step e1), such that the total mass of non-colored fertilizer particles in each stream B1, B2, . . . Bn of non-colored fertilizer particles represents a weight percentage ranging from 0.5 to 5 weight % of the total mass of non-colored fertilizer particles in the stream A of non-colored fertilizer particles.

The method according to the disclosure further allows for precisely controlling the amounts of fertilizer particles that are colored, in order to produce the product of interest to the market, which will allow the customer to validate that the fertilizer product is according to the brand of his or her choice. According to one embodiment of the method of the disclosure, the mass of colored fertilizer particles in each particle stream B1, B2, . . . Bn represents 0.5-1.5 weight % or about 1 weight % of the total mass of non-colored fertilizer particles in particle stream A of non-colored fertilizer particles.

The person skilled in the art will understand that, alternatively, either the total mass of non-colored fertilizer particles in the stream A directly or the total mass of fertilizer particles collected after step d1) can be determined and used for adjusting the continuous separation step a1), such that the total mass of fertilizer particles in each particle stream B1, B2, . . . Bn represents a weight percentage ranging from 0.5 to 5 weight % of the total mass of non-colored fertilizer particles in the stream A of non-colored fertilizer particles, particularly from 0.5-1.5 weight % or about 1 weight % of the mass of non-colored fertilizer particles in particle stream A of non-colored fertilizer particles.

According to one embodiment of the method of the disclosure, the fertilizer particles processed by the method are based on compounds selected from the group of calcium nitrate, ammonium nitrate, calcium ammonium nitrate, urea and NPK, having a median size of about 1 to 6 mm, preferably from 3.5 to 4.0 mm, and the method further comprises the step of adjusting the temperature of the fertilizer particles to a temperature of about 40° C., before step a1). The method has been found to be particularly suitable for the continuous production of a mixture of colored and non-colored particles based on one of calcium nitrate, ammonium nitrate, calcium ammonium nitrate, urea and NPK.

Such a mixture is of particular interest from a brand recognition point of view, the method of the disclosure provides a rapid and economic way of producing a fertilizer product comprising colored and non-colored fertilizer particles that can subsequently easily be validated by the customer. Therefore, the method of the disclosure can be applied to specific fertilizer particles that represent an important market and for which brand recognition is especially important.

According to one embodiment of the method of the disclosure, the fertilizer particles in each stream B1, B2, . . . Bn of non-colored fertilizer particles become fully colored in step b1) by a different coloring agent. It is to be noted that the method of the disclosure is versatile. Indeed, the method allows either for one or several types of colored fertilizer particles, in other words one or more coloring agents, in a mixture of colored and non-colored fertilizer particles. According to the brand need, only one particle stream of non-colored fertilizer particles, B1, may be subjected to the coloring step b1). Alternatively, several streams B1, B2, . . . Bn of non-colored fertilizer particles may each be subjected in parallel to the coloring step, each in a different coloring section, in each of which coloring is performed with a different coloring agent. Through this latter alternative, a mixture of fertilizer particles with several types of colored fertilizer particles is obtained. The method of the disclosure hence allows for the continuous production of a mixture, with predefined ratios of several types of fully colored fertilizer particles and non-colored fertilizer particles. This is especially important for the purpose of recognizing specific brands.

According to one embodiment of the method of the disclosure, the method allows for the continuous production of a mixture of fully colored and non-colored fertilizer particles having a median size of about 1 to 6 mm, preferably from 3.5 to 4.0 mm, wherein the fertilizer particles are produced from a liquid melt based on compounds selected from the group of calcium nitrate, ammonium nitrate, calcium ammonium nitrate, urea and NPK, with a predefined ratio of fully colored and non-colored fertilizer particles, starting from a stream A of non-colored fertilizer particles, and comprises the steps of:
- g1) producing the stream A of non-colored fertilizer particles from the liquid melt;
- h1) adjusting the temperature of the non-colored fertilizer particles in stream A to a temperature of about 40° C.;
- a1') continuously separating the stream A of non-colored fertilizer particles into a stream C of non-colored fertilizer particles and a parallel stream B1 of non-colored fertilizer particles in a predefined ratio;
- b1') continuously coloring the fertilizer particles from the particle stream B1 of non-colored fertilizer particles obtained from step a1') with a water-soluble, polymeric coloring agent using a coloring drum or a spray-coater, such that the particles become fully colored;
- c1') continuously joining the parallel particle stream B1, now comprising the fully colored fertilizer particles, obtained from step b1'), with the particle stream C of non-colored fertilizer particles, and;

d1') coating the mixture of fully colored and non-colored fertilizer particles obtained from step c1') with a non-coloring coating agent.

According to a further aspect of the disclosure, a system for the continuous production of a mixture of fully colored and non-colored fertilizer particles having a median size of about 1 to 6 mm, with a predefined ratio of fully colored and non-colored fertilizer particles, is disclosed and comprises:

a2) separating means for continuously separating a stream A of non-colored fertilizer particles into a stream C of non-colored fertilizer particles and one or more parallel streams B1, B2, . . . Bn of non-colored fertilizer in a predefined ratio. Particularly, said separating means comprises an inlet for the stream A of non-colored fertilizer particles, an outlet for stream C of non-colored fertilizer particles and one or more outlets for each of streams B1, B2, . . . Bn of non-colored fertilizer particles;

b2) one or more coloring means for continuously coloring the non-colored fertilizer particles from each of the parallel streams B1, B2, . . . Bn of non-colored fertilizer particles obtained from separating means a2) with a non-rub-off coloring agent, such that the non-colored fertilizer particles become fully colored. Particularly, each of said one or more outlets for each of streams B1, B2, . . . Bn of non-colored fertilizer particles is connected to a coloring means, downstream of said outlet;

c2) means for continuously joining the parallel streams B1, B2, . . . Bn now comprising the fully colored fertilizer particles, obtained from coloring means b2) with the stream C of non-colored fertilizer particles downstream the separating means a2), thereby obtaining the mixture of fully colored and non-colored fertilizer particles. Particularly, said joining means is situated downstream of the separating means and the coloring means and comprises an inlet for stream C of non-colored fertilizer particles and one or more inlets for each of parallel streams B1, B2, . . . Bn, of the fully colored fertilizer particles, and;

d2) optionally, processing means for processing the mixture of fully colored and non-colored fertilizer particle stream obtained from joining means c2). Particularly, said processing means are situated downstream of the joining means.

According to one embodiment of the system of the system of the disclosure, the processing means d2) are coating means.

According to one embodiment of the system of the disclosure, the coloring means b2) comprises a coloring drum or a spray-coater. A micro volume sprayer coloring device is particularly suitable for incorporation in the system according to the disclosure, as means for continuously, fully coloring the fertilizer particles. In a micro volume sprayer, droplets of the coloring agent are sprayed from a rotating disc on the fertilizer particles as they fall through the micro volume sprayer. The fully colored fertilizer particles at the outlet of micro volume sprayer can optionally be mixed in a screw mixer to achieve a homogeneous color coverage.

A coloring drum is another particularly suitable coloring means b2) for continuously fully coloring the fertilizer particles. In a coloring drum, the coloring agent is sprayed onto the fertilizer particles by a nozzle, atomized with nitrogen at the inlet of the drum. The coloring agent is provided by dosing pumps which are pumping from a small reservoir tank.

According to one embodiment of the system of the disclosure, the system further comprises:

e2) determining means for determining the total mass of non-colored fertilizer particles in each of the parallel streams B1, B2, . . . Bn of non-colored fertilizer particles and the stream C of non-colored fertilizer particles, obtained from means a2);

f2) separation adjusting means for adjusting the continuous separation by separating means a2) according to the total mass of non-colored fertilizer particles in each of the streams B1, B2, . . . Bn of non-colored fertilizer particles and the stream C of non-colored fertilizer particles determined by determining means e2), such that the total mass of non-colored fertilizer particles in each particle stream B1, B2, . . . Bn represents a weight percentage ranging from 0.5 to 5 weight % of the total mass of non-colored fertilizer particles in the stream A of non-colored fertilizer particles.

As an example, means for determining the total mass of non-colored fertilizer particles can be a loss-in-weight feeder. In addition, the system may comprise means for dosing the coloring agent in the coloring means a2) for coloring as a function of the weight of non-colored fertilizer particles entering the coloring means a2). Such dosing of the coloring agent can also be achieved through the use of a loss-in weight feeder.

The system according to the disclosure allows for the continuous production of a mixture with predefined ratios of several types of fully colored and non-colored fertilizer particles. The amount of each type of colored fertilizer particle in the final mixture is precisely controlled. The mixture can be produced from a single production line and particles can be colored in parallel from this line. Therefore, the system of the disclosure results in saving costs associated to the system and also avoids having to clean one coloring section to proceed to coloring fertilizer particles with a different color. Furthermore, as the fertilizer particles become fully colored from a single coloring step, there is no need for the particles to be processed more than once through the coloring section and the streams of fully colored and non-colored particles can be rejoined downstream of separation means a2).

According to one embodiment of the system of the disclosure, the system further comprises a production plant for the production of fertilizer particles produced from a liquid melt based on compounds, selected from the group of calcium nitrate, ammonium nitrate, calcium ammonium nitrate, urea and NPK. According to an embodiment, the system thus further comprises:

g2) production means for producing a stream A of non-colored fertilizer particles from a liquid melt of fertilizer compounds, particularly from a liquid melt based on compounds, selected from the group of calcium nitrate, ammonium nitrate, calcium ammonium nitrate, urea and NPK;

h2) temperature adjusting means for adjusting the temperature of the non-colored fertilizer particles, produced by production means g2) to a temperature of about 40° C.;

wherein coloring means b2) comprises a coloring drum or a spray-coater, and wherein processing means d2) comprises coating means.

Cooling of the particles can, for example, be achieved through the use of a fluidized bed cooler.

According to a further aspect of the disclosure, the use of a system according to the system of the disclosure is disclosed for performing the method according to the method of the disclosure, is disclosed.

According to a further aspect of the disclosure, ammonium nitrate-based or calcium ammonium nitrate-based fertilizer particles are disclosed. The fertilizer particles have a median size of about 1 to 6 mm, preferably from 3.5 to 4.0 mm, 0.5-1.5 weight % or about 1 weight % of the particles is fully colored by a layer of a water-soluble, polymeric coloring agent, about 100 weight % of the fertilizer particles is coated by a layer of a non-coloring coating agent, and the layer of the non-coloring coating agent is on top of the layer of the coloring agent of the fully colored fertilizer particles.

EXAMPLE

Reference is made to the FIG. 1 below. A stream A of particles of calcium ammonium nitrate was continuously cooled down to a temperature range of 40° C. on a fluidized bed (100) at a mass flow rate of 135 ton per hour. Subsequently, the stream was continuously separated into a stream B of non-colored fertilizer particles and a stream C of non-colored fertilizer particles. The mass flow rate of each of the streams B and C was then continuously measured. An average mass flow rate of 1.35 ton per hour was measured for stream B and an average mass flow rate of 133.6 ton per hour was measured for stream C. The separation of stream A of non-colored fertilizer particles into stream B and stream C was continuously adjusted in order for the ratio of the mass flow rate of stream B of non-colored fertilizer particles over the mass flow rate of stream C of non-colored fertilizer particles to be 1/99. Stream B of non-colored fertilizer particles was then continuously sent to a coloring drum (200) at a mass flow rate of 1.35 ton per hour.

In the coloring drum (200) the calcium ammonium nitrate particles were fully colored using the non-water-soluble, polymeric blue colorant Liquitint® CU5050 from Milliken in monopropylene glycol (50 weight %) at a temperature ranging from 37 to 40° C. The coloring drum (200) comprises a nozzle, atomized with nitrogen at the inlet of the drum, in order to continuously spray the coloring agent onto the particles, and pumps (not shown) in order to pump the coloring agent from a small reservoir tank. The mass flow rate of fully colored ammonium nitrate particles exiting the coloring drum was 1.35 ton per hour.

Stream B of colored fertilizer particles exiting the coloring drum then was continuously joined with stream C of non-colored fertilizer particles having a mass flow rate of 133.6 ton per hour. The combined stream of fully colored and non-colored fertilizer particles then was continuously directed to a coating drum (300), in which a moisture repellant coating oil, coating Novoflow D649++ from Novotec, was applied at a temperature ranging from 80 to 85° C. The final product then was collected at the outlet of the coating drum (300).

The invention claimed is:

1. A method for a continuous production of a mixture of fully colored and non-colored fertilizer particles having a median size of about 1 to 6 mm with a predefined ratio of the fully colored and non-colored fertilizer particles, starting from a stream A of non-colored fertilizer particles, comprising steps of:
   a1) continuously separating the stream A of the non-colored fertilizer particles into a stream C of non-colored fertilizer particles and one or more parallel streams B1, B2, . . . Bn of non-colored fertilizer particles in the predefined ratio;
   b1) continuously coloring the non-colored fertilizer particles from the parallel streams B1, B2, . . . Bn obtained from step a1) with a non-rub-off coloring agent, such that the non-colored fertilizer particles become fully colored;
   c1) continuously joining the parallel streams B1, B2, . . . Bn, now comprising the fully colored fertilizer particles, obtained from step b1), with the stream C of the non-colored fertilizer particles downstream of the separation step a1), thereby obtaining the mixture of the fully colored and non-colored fertilizer particles, and;
   d1) optionally, processing the mixture of the fully colored and non-colored fertilizer particles, obtained from step c1).

2. The method according to claim 1, wherein the process step d1) comprises coating the fertilizer particles with a non-coloring coating agent.

3. The method according to claim 2, wherein the non-rub-off coloring agent is a water-soluble, polymeric coloring agent and wherein the coating agent prevents or reduces moisture uptake.

4. The method according to claim 1, further comprising the steps of:
   E1) online determining a total mass of the non-colored fertilizer particles in each of the parallel streams B1, B2, . . . Bn of the non-colored fertilizer particles and the stream C of the non-colored fertilizer particles, obtained from step a1);
   f1) adjusting the continuous separation in step a1) according to the total mass of the non-colored fertilizer particles in each of the streams B1, B2, . . . Bn of the non-colored fertilizer particles and the stream C of the non-colored fertilizer particles, determined in step e1), such that the total mass of the non-colored fertilizer particles in each stream B1, B2, . . . Bn of the non-colored fertilizer particles represents a weight percentage ranging from about 0.5 to 5 weight % of the total mass of the non-colored fertilizer particles in the stream A of the non-colored fertilizer particles.

5. The method according to claim 4, wherein the mass of fertilizer particles in each stream B1, B2, . . . Bn of the non-colored fertilizer particles represents about 1 weight % of the mass of the non-colored fertilizer particles in the stream A of the non-colored fertilizer particles.

6. The method according to claim 1, wherein the fertilizer particles are based on compounds selected from a group of calcium nitrate, ammonium nitrate, calcium ammonium nitrate, urea and NPK, and have a median size of about 1 to 6 mm, and wherein the method further comprises the step of adjusting a temperature of the fertilizer particles in the stream A of the non-colored fertilizer particles to a temperature of about 40° C., before step a1).

7. The method according to claim 6, wherein the median size of the fertilizer particles is 3.5 to 4.0 mm.

8. The method according to claim 1, wherein the fertilizer particles in each stream B1, B2, . . . Bn of the non-colored fertilizer particles become fully colored in step b1) by a different coloring agent in each stream B1, B2, . . . Bn.

9. The method according to claim 1 for the continuous production of a mixture of the fully colored and non-colored fertilizer particles having a median size of about 1 to 6 mm, with a predefined ratio of the fully colored and non-colored fertilizer particles, wherein the fertilizer particles are produced from a liquid melt based on compounds selected from a group of calcium nitrate, ammonium nitrate, calcium ammonium nitrate, urea and NPK, starting from a stream A of the non-colored fertilizer particles, comprising consecutive steps of:

g1) producing the stream A of the non-colored fertilizer particles from the liquid melt;

h1) adjusting a temperature of the non-colored fertilizer particles in the stream A to a temperature of about 40° C.;

a1') continuously separating the stream A of the non-colored fertilizer particles into a stream C of the non-colored fertilizer particles and a parallel stream B1 of the non-colored fertilizer particles in a predefined ratio;

b1') continuously coloring the non-colored fertilizer particles from the parallel stream B1 of the non-colored fertilizer particles obtained from step a1') with a water-soluble, polymeric non rub-off coloring agent using a coloring drum or a spray-coater, such that the fertilizer particles become fully colored;

c1') continuously joining the parallel stream B1, now comprising the fully colored fertilizer particles, obtained from step b1'), with the stream C of the non-colored fertilizer particles downstream the separation step a1'), thereby obtaining the mixture of the fully colored and non-colored fertilizer particles, and;

d1') coating the mixture of the fully colored and non-colored fertilizer particles obtained from step c1') with a non-coloring coating agent.

10. The method according to claim 9, wherein the median size of the fertilizer particles is 3.5 to 4.0 mm.

\* \* \* \* \*